United States Patent [19]

Valencia et al.

[11] Patent Number: 4,923,493

[45] Date of Patent: May 8, 1990

[54] METHOD AND APPARATUS FOR CRYOGENIC SEPARATION OF CARBON DIOXIDE AND OTHER ACID GASES FROM METHANE

[75] Inventors: Jaime A. Valencia, Houston, Tex.; Donald J. Victory, New Orleans, La.

[73] Assignee: Exxon Production Research Company, Houston, Tex.

[21] Appl. No.: 234,366

[22] Filed: Aug. 19, 1988

[51] Int. Cl.[5] .................................................. F25J 5/00
[52] U.S. Cl. ........................................ 62/13; 62/20; 62/24; 62/28; 62/31
[58] Field of Search ...................... 62/9, 11, 12, 13, 14, 62/15, 23-25, 27-28, 31-34, 36, 41-42, 20

[56] References Cited

U.S. PATENT DOCUMENTS

| | | | |
|---|---|---|---|
| 4,149,864 | 4/1979 | Eakman et al. | 61/11 |
| 4,246,015 | 1/1981 | Styring, Jr. | 62/12 |
| 4,318,723 | 3/1982 | Holmes et al. | 62/20 |
| 4,370,156 | 1/1983 | Goddin, Jr. et al. | 62/17 |
| 4,383,842 | 5/1983 | O'Brien | 62/28 X |
| 4,511,382 | 4/1985 | Valencia et al. | 62/20 |
| 4,533,372 | 6/1985 | Valencia et al. | 62/12 |
| 4,687,499 | 8/1987 | Aghili | 62/24 |
| 4,698,081 | 10/1987 | Aghili | 62/24 |

OTHER PUBLICATIONS

Article entitled "Integrated Low Temperature Processing of Sour Natural Gas", by Robert D. Denton and D. D. Rule, Proceedings of the Sixty-Fourth Annual Convention, Mar. 18–20, 1985, pp. 92–96.
Article entitled "Development and Application of the Controlled Freeze Zone Process", by R. C. Haut, R. D. Denton, E. R. Thomas, 7th Offshore South East Asia Conference, Singapore, Feb. 2–5, 1988, Paper No. OSEA §§197.
Article entitled "The CFZ Process: Direct Methane--Carbon Dioxide Fractionation", by Donald J. Victory and Jaime A. Valencia, 66th Annual GPA Convention, Denver, Colorado, Mar. 16–18, 1987.

*Primary Examiner*—Ronald C. Capossela
*Attorney, Agent, or Firm*—Raul R. Montes

[57] ABSTRACT

A method for conditioning the freezing zone liquid feedstream in the cryogenic separation of carbon dioxide and other acid gases from methane by use of distillation and a controlled freezing zone, including the step of sub-cooling the freezing zone liquid feedstream, so that this freezing zone liquid feedstream remains close to, but not quite at, carbon dioxide solidification conditions.

13 Claims, 3 Drawing Sheets

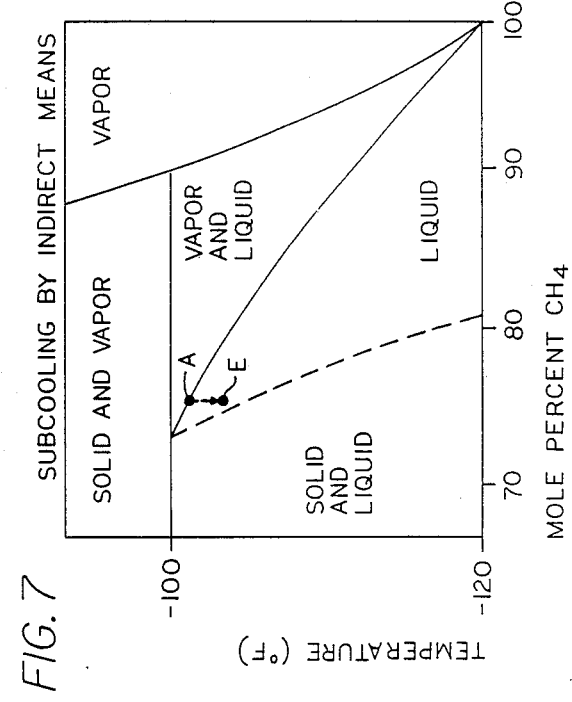
FIG. 5
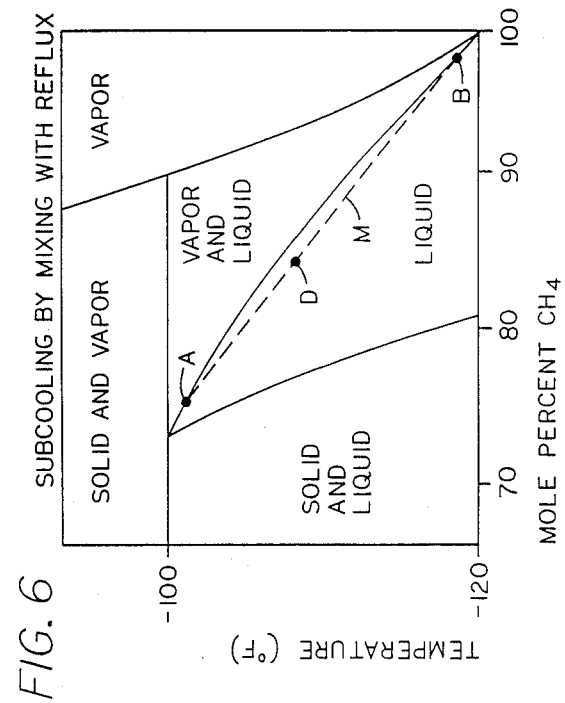
FIG. 7
FIG. 4
FIG. 6

METHOD AND APPARATUS FOR CRYOGENIC SEPARATION OF CARBON DIOXIDE AND OTHER ACID GASES FROM METHANE

FIELD OF THE INVENTION

This invention relates to the cryogenic separation of carbon dioxide and other acid gases from methane using cryogenic distillation in combination with a controlled freezing zone. More particularly, this invention relates to the conditioning of the freezing zone liquid feedstream prior to its entering the freezing zone of a cryogenic separation column containing a controlled freezing zone.

BACKGROUND OF THE INVENTION

U.S. Pat. No. 4,533,372 to Jaime A. Valencia and Robert D. Denton discloses a method and apparatus for separating carbon dioxide and other acid gases from methane by treating the feedstream in a controlled freezing zone (hereinafter "Controlled Freezing Zone Process"). The Controlled Freezing Zone Process is one which utilizes a controlled freezing zone, which permits the solidification of carbon dioxide in a controlled manner, and which simultaneously allows the thermodynamic distillation of a feedstream mixture containing carbon dioxide and methane in one distillation column.

Prior to the Controlled Freezing Zone Process, complexities in the thermodynamics of carbon dioxide-methane mixtures made difficult, if not impossible, the separation of such mixtures via conventional cryogenic distillation. These complexities relate to the formation of solid carbon dioxide at equilibrium with the vapor-liquid mixtures of carbon dioxide in methane at the particular conditions of temperature, pressure, and composition at which the cryogenic distillation of these compounds take place. The formation of solids in a distillation tower has the undesirable potential effect of plugging the tower and its associated equipment.

The Controlled Freezing Zone Process is a method for separating carbon dioxide and other acid gases from methane using cryogenic distillation in combination with a controlled freezing zone. Specifically, the invention includes a cryogenic distillation tower having a zone which is adapted to handling the production of solid carbon dioxide. The zone is designed to allow the formation of carbon dioxide solids and to allow contact of vapor, liquid, and solid necessary for separation by distillation to occur.

Optimum operation of the Controlled Freezing Zone Process requires the liquid sprayed into the freezing zone of the tower ("freezing zone liquid feedstream") to be at conditions which are close to but not quite at carbon dioxide solidification conditions. It is highly undesirable for the freezing zone liquid feedstream to attain solidification conditions before entering the freezing zone.

In a well balanced system, the solidification of carbon dioxide will occur only in the freezing zone and not in any other part of the system, particularly in the freezing zone liquid feedstream lines. A heat leak into the lines containing the freezing zone liquid feedstream on its way to the freezing zone can lead to the solidification of carbon dioxide prior to its introduction into the freezing zone. For example, such heat leaks can occur due to insufficient or defective piping insulation, or by dissipation of the heat generated by the freezing zone liquid feedstream pumps. Solidification conditions may also occur for other reasons, such as for example, a drop in pressure on the suction side of the spray pump which sprays the liquid into the freezing zone.

There is a need therefore for a simple method and apparatus for optimizing and controlling the solidification conditions of carbon dioxide in the freezing zone liquid feedstream lines. Preferably such method and apparatus will maintain the freezing zone liquid feedstream at conditions close to, but not quite at, solidification conditions. In addition, such method and apparatus will allow optimum operation of the controlled freezing zone in the presence of changing conditions which may occur in the freezing zone liquid feedstream lines.

SUMMARY OF THE INVENTION

Briefly, Applicants' invention includes the sub-cooling of the freezing zone liquid feedstream by adding portions of colder, leaner reflux which is redirected back into the freezing zone liquid feedstream supply lines. Thermodynamically, introducing a portion of the tower's reflux liquid into the freezing zone liquid feedstream lines results in a sub-cooled freezing zone liquid feedstream which remains away from solidification conditions until it is sprayed into the freezing zone section of the tower. Alternatively, the freezing zone liquid feedstream may be sub-cooled by means of indirect cooling.

BRIEF DESCRIPTION OF THE DRAWINGS

FIGS. 4–7 show enlargements of the portion of FIG. 1 designated as Section "A—A", which illustrates with greater particularity the thermodynamics of the present invention.

DESCRIPTION OF THE PREFERRED EMBODIMENTS

Figure 1:
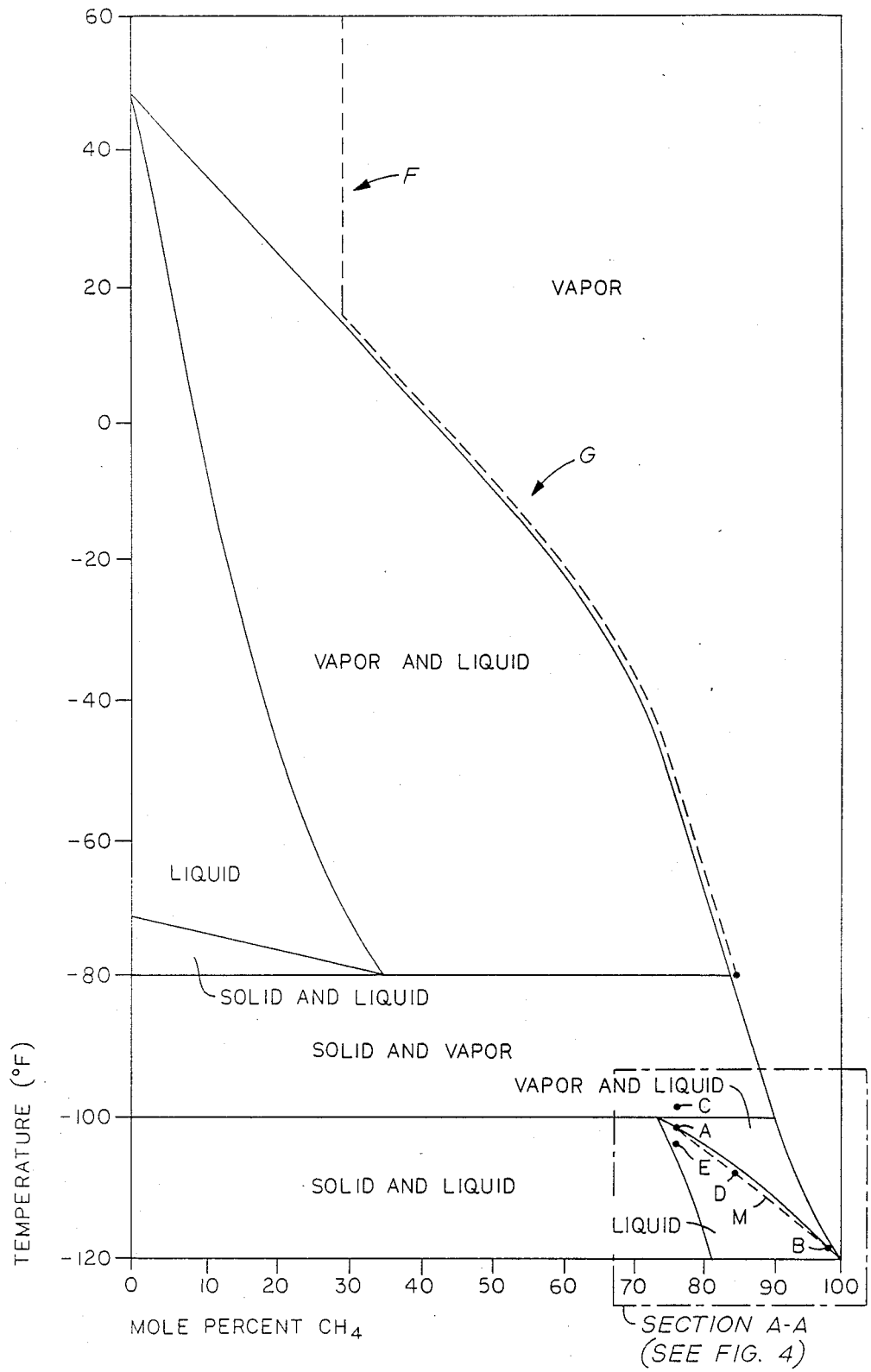
FIG. 1 is a binary phase diagram for methane and carbon dioxide as a function of temperature at 650 psia.

As mentioned above, prior to U.S. Pat. No. 4,533,372 to Valencia et al., the phenomenon of carbon dioxide solids formation was considered a problem in performing the cryogenic distillation of carbon dioxide and methane. This phenomenon is thermodynamically illustrated in FIG. 1. FIG. 1 is a binary phase diagram of carbon dioxide and methane at 650 psia. This diagram is based on data from H. G. Donnelly, and D. L. Katz, Ind. Eng. Chem. 46, 511 (1954). The diagram shows regions for the various phases of carbon dioxide: liquid only, vapor only, vapor and liquid existing together, and regions having solids existing with either vapor or liquid.

FIG. 1 illustrates that the formation of carbon dioxide solids would be expected if separation of a carbon dioxide-methane mixture is attempted at 650 psia. For example, cooling a 30% methane/70% carbon dioxide mixture initially at 60° F., along line "F" in FIG. 1 will cause liquid to form beginning at about 15° F. At this point, vapor-liquid equilibrium distillation may take place. As this vapor rises in a distillation column, the vapor, at equilibrium with the liquid, would increase in methane content along line "G". As the temperature is lowered to about −80° F., solid carbon dioxide would begin to form. Further methane enrichment of the vapor product stream cannot be achieved without the formation of solid carbon dioxide. Solid carbon dioxide renders conventional distillation tower internals inoperable. At this point, the product methane stream in this example would have as much as 15 mole percent carbon dioxide remaining in it.

The Controlled Freezing Zone Process of U.S. Pat. No. 4,533,372 to Valencia et al. teaches how the solidification of carbon dioxide may be allowed to occur in a controlled manner. Thus, it becomes unnecessary to avoid the conditions at which carbon dioxide solidifies, and distillation of a carbon dioxide-methane mixture can continue to take place in one distillation tower in accordance with such mixture's thermodynamic requirements.

Figure 2:
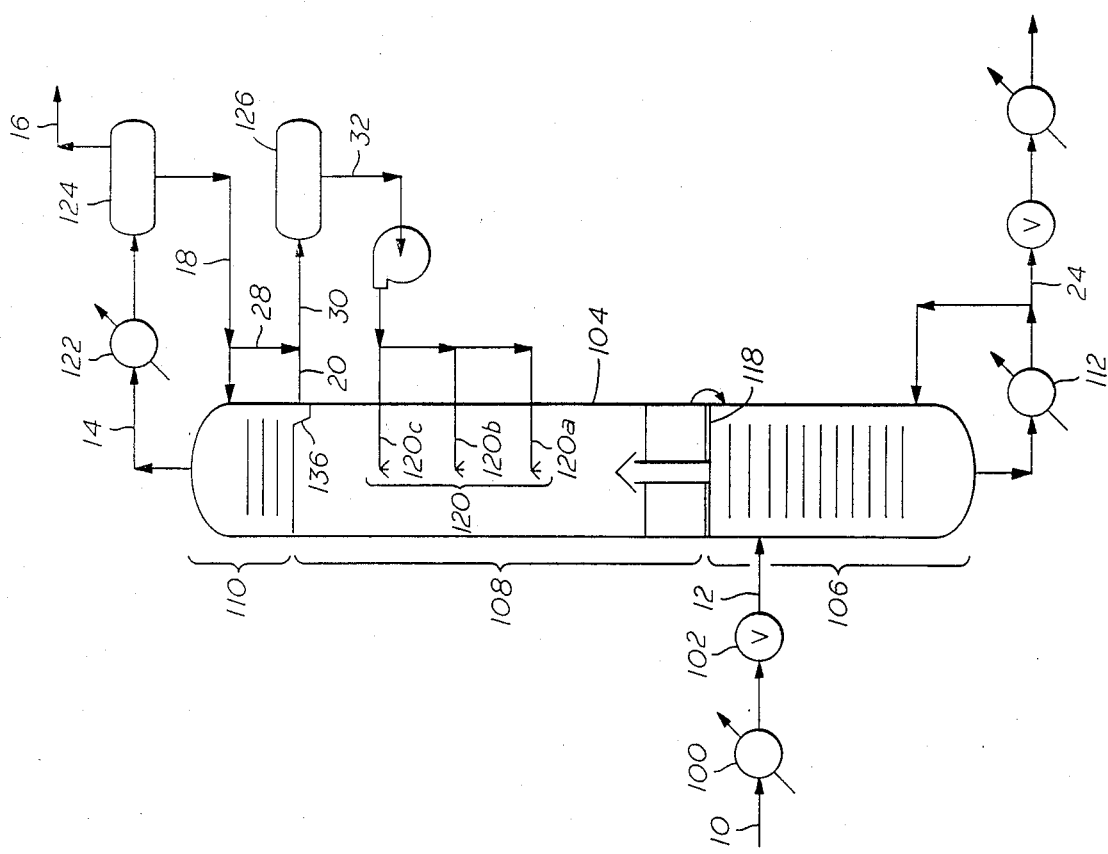
FIG. 2 is a schematic diagram of an example process unit using the present invention.

FIG. 2 illustrates, in schematic fashion, the concept of separating carbon dioxide from methane using the Controlled Freezing Zone Process including the present invention. TABLE I illustrates the approximate material balance showing the thermodynamic conditions at various points enumerated in FIG. 2 for an example feedstream containing approximately 79.5% methane and 18.5% carbon dioxide.

compounds, such as nitrogen, hydrogen sulfide, and other hydrocarbons, is introduced into the tower through line 12. This feed stream may be first cooled in indirect heat exchanger 100 and expanded through Joule-Thompson ("J-T") valve 102. The function of pre-cooler 100 and J-T valve 102 is to drop the temperature to a level suitable for introduction of this stream into the methane-carbon dioxide distillation tower 104. For the purposes of this illustration, the distillation tower 104 is operated at a pressure of 550 psia, and the tower feed entering through line 12 is at a temperature of −62° F. One skilled in the art would readily perceive that similar illustrations could be made for feedstreams at other suitable combinations of temperature, pressure, and composition.

TABLE II shows an approximate characterization of the distillation tower 104 made by using an Exxon proprietary computer program based on well known chemical engineering principles.

TABLE II

| | Temperature °F. | VAPOR | | | LIQUID | | |
|---|---|---|---|---|---|---|---|
| | | Flow (lb. moles/hr) | Methane (Mole Fraction) | Carbon Dioxide (Mole Fraction) | Flow (lb. moles/hr) | Methane (Mole Fraction) | Carbon Dioxide (Mole Fraction) |
| Condenser | −129.0 | 17,844 | .9792 | .0023 | 35,743 | .9862 | .0050 |
| Tray 1 | −128.1 | 53,787 | .9838 | .0041 | 35,374 | .9853 | .0089 |
| Tray 2 | −127.5 | 53,218 | .9833 | .0067 | 34,666 | .9805 | .0146 |
| Tray 3 | −126.7 | 52,511 | .9800 | .0104 | 33,505 | .9719 | .0233 |
| Tray 4 | −125.6 | 51,350 | .9744 | .0160 | 31,673 | .9576 | .0372 |
| Spray | −123.7 | 49,517 | .9654 | .0246 | 28,599 | .9323 | .0611 |
| Tray 5 | −52.5 | 2,237 | .7268 | .2547 | 6,771 | .1769 | .7990 |
| Tray 6 | −11.1 | 2,654 | .4500 | .5225 | 7,518 | .0966 | .8761 |
| Tray 7 | 15.2 | 3,400 | .2125 | .7538 | 8,118 | .0440 | .9273 |
| Tray 8 | 27.5 | 4,001 | .0884 | .8760 | 8,432 | .0182 | .9536 |
| Tray 9 | 32.7 | 4,315 | .0347 | .9311 | 8,563 | .0071 | .9662 |
| Tray 10 | 34.9 | 4,446 | .0129 | .9561 | 8,607 | .0026 | .9729 |
| Reboiler | 36.0 | 4,489 | .0043 | .9691 | 4,117 | .0009 | .9771 |

N.B. The mole fraction of methane and carbon dioxide in this Example do not add up to 1.0 because of the presence of minor amounts of ethane, propane, isobutane, nitrogen, and hydrogen sulfide. The disposition of these constituents in the two tower products is, however, shown in TABLE I.

As shown in this example, splitter tower 104 is separated into three distinct sections. The lower distillation section 106, middle controlled freezing zone 108, and an upper distillation section 110. In this example, the tower feed, as mentioned above, is introduced into the lower distillation section 106 through line 12 where it under-

TABLE I

CONTROLLED FREEZING ZONE ("CFZ") OPERATING CONDITIONS
Number of Theoretical Trays: 10*
Feed Tray: 5**
CFZ Section: Between trays 4 and 5
Reflux Ratio: 2.0

| Stream No. | Raw Gas 10 | Tower Feed 12 | Condenser Feed 14 | Overhead Product 16 | Reflux 18 | Sprays 20 | CFZ Liquid 22 | Bottoms Product 24 |
|---|---|---|---|---|---|---|---|---|
| Pressure (psia) | 600 | 550 | 550 | 550 | 550 | 550 | 550 | 550 |
| Temperature (°F.) | 100 | −62 | −128 | −129 | −129 | −124 | −53 | 36 |
| Flowrate (lb. mole/hr) | 21961 | 21961 | 53587 | 17844 | 35743 | 28599 | 6771 | 4117 |
| Composition (Mole %) | | | | | | | | |
| Nitrogen | 1.497 | 1.497 | 1.198 | 1.843 | 0.876 | 0.406 | 0.041 | — |
| Methane | 79.575 | 79.575 | 98.386 | 97.923 | 98.618 | 93.242 | 17.688 | 0.087 |
| CO$_2$ | 18.509 | 18.509 | 0.414 | 0.234 | 0.503 | 6.109 | 79.901 | 97.681 |
| H$_2$S | 0.121 | 0.121 | 0.0004 | 0.0002 | 0.0005 | 0.021 | 0.484 | 0.644 |
| Ethane | 0.251 | 0.251 | 0.001 | — | 0.002 | 0.222 | 1.707 | 1.337 |
| Propane | 0.030 | 0.030 | — | — | — | — | 0.117 | 0.160 |
| Iso-Butane | 0.017 | 0.017 | — | — | — | — | 0.062 | 0.091 |

*Does not include the condenser or the reboiler.
**Tray numbering begins from top.

In this example, a dried wellhead gas stream 10 at about 600 psia containing approximately 79.5% methane, 18.5% carbon dioxide, and the remainder other distillation section 106 through line 12 where it undergoes typical distillation. The internals of lower section 106 may include suitable trays, downcomers, and weirs, as are suitable for separating a carbon dioxide-methane mixture. Lower section 106 may instead be packed with known tower packing means. Liquid carbon dioxide product leaves the bottom of the section, is heated in reboiler 112, and a portion is returned to the tower as reboiled liquid. The remainder leaves the process as a product via line 24.

In the lower distillation section 106, the lighter vapors leave this distillation section and enter the controlled freezing zone 108 via chimney tray 118. Once in controlled freezing zone 108, those vapors contact the liquid spray (sprayed freezing zone liquid feedstream which as used here may also be referred to as spray liquid) emanating from nozzles or spray jet assemblies 120. The vapor then continues up through the upper distillation section 110. Reflux is introduced to the tower through line 18. Vapor leaves tower 104 through line 14, is partially condensed in reflux condenser 122 and is separated into liquid and vapor phases in reflux drum 124. Liquid from reflux drum 124 is returned to the tower via line 18. The vapor from the drum is taken off as a product in line 16 for subsequent sale to a pipeline or condensation as LNG.

In a well balanced system, the solidification of carbon dioxide will occur only in the freezing zone and not in any other part of the system, particularly in the freezing zone liquid feedstream lines. A heat leak into the lines containing the freezing zone liquid feedstream on its way to the freezing zone can lead to the solidification of carbon dioxide prior to its introduction into the freezing zone. For example, such heat leaks can occur due to insufficient or defective piping insulation, or by dissipation of the heat generated by the freezing zone liquid feedstream pumps. Thermodynamically, this is illustrated in FIG. 1 and FIG. 4 by point A which corresponds to the freezing zone liquid feedstream. Any heat supplied to the freezing zone liquid feedstream will cause its conditions to rise to point C, which is in the solid and vapor area, as shown in diagram 4b.

It is desirable for optimum operation of the Controlled Freezing Zone Process that the freezing zone liquid feedstream be at conditions which are close to but not quite at carbon dioxide solidification conditions. One way of accomplishing this objective is by sub-cooling the freezing zone liquid feedstream.

Figure 3:
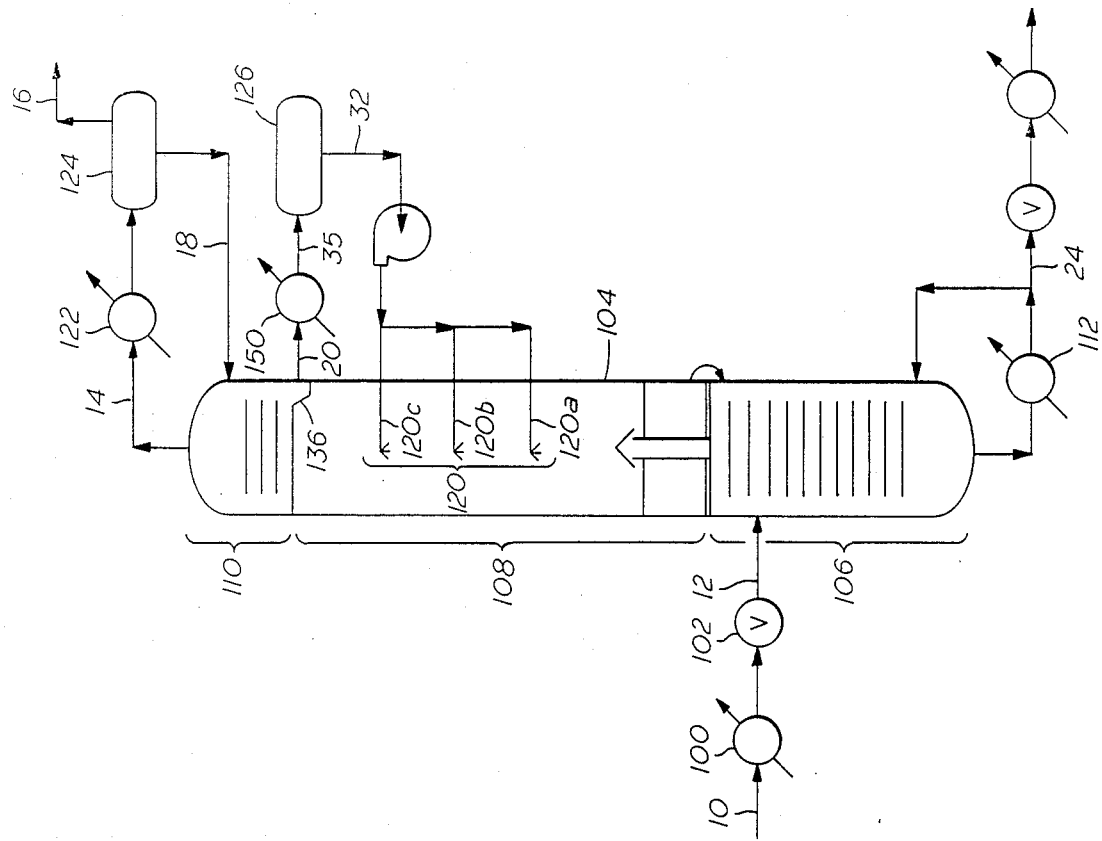
FIG. 3 is a schematic diagram of another example of a process unit using the present invention.

Sub-cooling the freezing zone liquid feedstream may be accomplished by recirculating reflux 18 into the liquid drawn from the bottom tray 136 through line 20 in the upper distillation section 110, as illustrated in FIG. 2 by line 28, or by means of indirect cooling, as illustrated in FIG. 3 by heat exchanger 150.

As mentioned above, a portion of reflux 18 may be introduced directly into line 20 via line 28. This reflux in line 28 bypasses upper distillation section 110 and is colder and leaner in $CO_2$ than the liquid drawn from tray 136 through line 20. Thus, the liquid in line 20 is diluted with colder liquid, leaner in $CO_2$, which moves the freezing zone liquid feedstream farther away from solidification conditions. Thermodynamically, the effect of adding colder, leaner in $CO_2$ reflux to line 20 may be illustrated with reference to FIG. 1 and FIG. 4 (diagram 4c). Mixing the liquid produced in upper distillation section 110 which is withdrawn from the tower via line 20, which is illustrated in FIG. 1 and FIG. 4 by point A, with a portion of the tower reflux 18, which is illustrated in FIG. 1 and FIG. 4 (diagram 4c) by point B, yields a liquid in line 30 (FIG. 2), illustrated in these FIGS. 1 and 4 (diagram 4c) by point D, which remains away from solidification conditions as desired.

It is noted that the addition of reflux also increases the flow rate through sprays 120a, 120b, and 120c, resulting in a fuller spray pattern and better vapor-liquid contact in the freezing zone. It is also noted however that too much liquid reflux diverted to line 20 via line 28 may result in lower performance and lower efficiency in the column 104. However, the addition of reflux into line 20 may be achieved in a controlled manner, thus maintaining acceptable efficiency levels for the column.

In another embodiment of this invention, conditioning of the freezing zone liquid feedstream may also be accomplished by means of indirect cooling. FIG. 3 illustrates this concept. Heat exchanger 150 may be located on return line 20 to maintain the temperature of the freezing zone liquid feedstream at conditions away from carbon dioxide solidifications.

With reference to FIGS. 1 and 4 (diagram 4d), sub-cooling the liquid drawn from tray 136 of upper distillation section 110 by means of heat exchanger 150 yields a liquid in line 35 illustrated in these Figures by point E. Because this approach involves no change in the compositon of the freezing zone liquid feedstream, care must be taken to control closely the temperature leaving heat exchanger 150, lest it will force this liquid into the solid/liquid area shown in FIGS. 1 and 4 (diagram 4d). As illustrated in FIGS. 1 and 4 (diagram 4c), temperature control is not as critical when reflux is used to sub-cool the freezing zone liquid feedstream because in this case there is a simultaneous change in composition, as shown in FIG. 4 (diagram 4c) by broken line M. Broken line M depicts the various conditions of this stream for various reflux addition rates to line 20.

It is contemplated that in certain circumstances, the upper distillation zone may not be needed, or at least, not desired. In such an instance, a portion of the vapor leaving the controlled freezing zone 108 would be condensed in overhead condenser 122 and returned as liquid feed to the nozzles. In this case, it should be clear that lines 18 and 32 are one and the same, and vessels 124 and 126 are one and the same. The freezing zone liquid feedstream in line 20 could then be sub-cooled by means of an indirect cooling means such as heat exchanger 150 which could be located on line 32.

Where the prior art has avoided the production of solid carbon dioxide in separating carbon dioxide from methane as counterproductive, the Controlled Freezing Zone Process takes advantage of the phenomenon by freezing the carbon dioxide in a clearly controlled fashion. The advantages offered by this process and accompanying equipment involve the elimination of solvents or additives, corresponding reduction in numbers of equipment pieces and complexity of their operation, and the production of a high pressure liquid carbon dioxide stream.

The above description and examples of the invention are offered only for the purpose of illustration, and is not intended that the invention be limited except by the scope of the appended claims.

We claim:

1. A method for separating a feedstream containing carbon dioxide and other acid gases from methane by use of a distillation column including a controlled freezing zone wherein a freezing zone liquid feedstream is introduced to allow the formation of carbon dioxide solids and simultaneous contact of vapor, liquid, and solids in said controlled freezing zone resulting in separation by distillation, including the step of:

sub-cooling the freezing zone liquid feedstream, so that this freezing zone liquid feedstream remains close to, but not quite at, carbon dioxide solidification conditions, to prevent the occurrence of solidification conditions in said freezing zone liquid feedstream prior to its entering said controlled freezing zone.

2. The method of claim 1 wherein the sub-cooling step is accomplished by means of mixing the freezing zone liquid feedstream with portions of the distillation overhead liquid product.

3. The method of claim 1 wherein the sub-cooling step is accomplished by means of indirect heat transfer.

4. A method for the separation of a feedstream containing methane and carbon dioxide in separation means comprising the steps of:

maintaining a distillation zone engineered to produce an enriched carbon dioxide liquid bottoms stream and a freezing zone vapor feedstream and operated at a temperature and pressure at which substantially no carbon dioxide solids are formed within said distillation zone, maintaining a freezing zone engineered to contact said freezing zone vapor feedstream with at least one sub-cooled freezing zone liquid feedstream containing methane at a temperature and pressure whereby both solids containing carbon dioxide and a methane-enriched vapor stream are formed, introducing said feedstream into said distillation zone, producing said enriched carbon dioxide liquid bottoms stream and said freezing zone vapor stream, introducing said freezing zone vapor feedstream into said freezing zone, contacting in said freezing zone said freezing zone vapor feedstream with at least one said sub-cooled freezing zone liquid feedstream, forming in said freezing zone said solids containing carbon dioxide and said methane-enriched vapor stream, melting said solids containing carbon dioxide and introducing a liquid stream containing said melted solids into said distillation zone, condensing at least a portion of the methane-enriched vapor stream and forming at least one freezing zone liquid feedstream with at least a portion of said condensed methane-enriched vapor stream, sub-cooling said freezing zone liquid feedstream to produce a sub-cooled freezing zone liquid feedstream, introducing said sub-cooled freezing zone liquid feedstream into said freezing zone, and recovering at least a portion of the remainder of the methane-enriched vapor stream as a methane-enriched product stream.

5. The method of claim 4 wherein said freezing zone liquid feedstream is sub-cooled by indirect heat transfer means.

6. A method for the separation of a feedstream containing methane and carbon dioxide in separation means comprising the steps of:

maintaining a first distillation zone engineered to produce an enriched carbon dioxide liquid bottoms stream and a freezing zone vapor feedstream and operated at a temperature and pressure at which substantially no carbon dioxide solids are formed within said first distillation zone, maintaining a freezing zone engineered to contact said freezing zone vapor feedstream with at least one sub-cooled freezing zone liquid feedstream containing methane at a temperature and pressure whereby both solids containing carbon dioxide and a methane-enriched vapor stream are formed, introducing said feedstream into said first distillation zone, producing said enriched carbon dioxide and said freezing zone vapor stream, introducing said freezing zone vapor feedstream into said freezing zone, contacting in said freezing zone said vapor feedstream with at least one said sub-cooled freezing zone liquid feedstream, forming in said freezing zone said solids containing carbon dioxide and said methane-enriched vapor stream, melting said solids containing carbon dioxide and introducing a liquid stream containing said melted solids into said first distillation zone, maintaining a second distillation zone engineered to produce at least one freezing zone liquid feedstream and an overhead vapor stream and operated at a temperature and a pressure at which substantially no carbon dioxide solids are produced within said second distillation zone, condensing at least a portion of the overhead vapor stream and recycling at least a portion of said condensed overhead vapor stream as reflux in said second distillation zone, introducing a portion of said reflux into said freezing zone liquid feedstream to produce the sub-cooled freezing zone liquid feedstream, introducing said sub-cooled freezing zone liquid feedstream into said freezing zone, and recovering at least a portion of the remainder of the overhead vapor stream as a methane-enriched product stream.

7. A method for the separation of a feedstream containing methane and carbon dioxide in separation means comprising the steps of:

maintaining a first distillation zone engineered to produce an enriched carbon dioxide liquid bottoms stream and a freezing zone vapor feedstream and operated at a temperature and pressure at which substantially no carbon dioxide solids are formed within said first distillation zone, maintaining a freezing zone engineered to contact said freezing zone vapor feedstream with at least one sub-cooled freezing zone liquid feedstream containing methane at a temperature and pressure whereby both solids containing carbon dioxide and a methane-enriched vapor stream are formed, introducing said feedstream into said first distillation zone, producing said enriched carbon dioxide and said freezing zone vapor stream, introducing said freezing zone vapor feedstream into said freezing zone, contacting in said freezing zone said vapor feedstream with at least one said sub-cooled freezing zone liquid feedstream, forming in said freezing zone said solids containing carbon dioxide and said methane-enriched vapor stream, melting said solids containing carbon dioxide and introducing a liquid stream containing said melted solids into said first distillation zone, maintaining a second distillation zone engineered to produce at least one freezing zone liquid feedstream and an overhead vapor stream and operated at a temperature and a pressure at which substantially no carbon dioxide solids are produced within said second distillation zone, condensing at least a portion of the overhead vapor stream and recycling at least a portion of said condensed overhead vapor stream as reflux in said second distillation zone, sub-cooling said freezing zone liquid feedstream to produce said sub-cooled freezing zone liquid feedstream, introducing said sub-cooled freezing zone liquid feedstream into said freezing zone, and recovering at least a portion of the remainder of the overhead vapor stream as a methane-enriched product stream.

8. The method of claim 7 wherein said freezing zone liquid feedstream is sub-cooled by indirect heat transfer means.

9. The method of claim 7 wherein said freezing zone liquid feedstream is sub-cooled by means of mixing the freezing zone liquid feedstream with portions of said reflux.

10. Means for separating a feedstream containing carbon dioxide and other acid gases from methane including a controlled freezing zone wherein a freezing zone liquid feedstream is introduced to allow the formation of carbon dioxide solids and simultaneous contact of vapor, liquid, and solids in said controlled freezing zone resulting in separation by distillation, comprising:

means for sub-cooling said freezing zone liquid feedstream, so that said freezing zone liquid feedstream remains close to, but not quite at, carbon dioxide solidification conditions to prevent the occurrence of solidification conditions in said freezing zone liquid feedstream prior to its entering said controlled freezing zone.

11. The separation means of claim 10 wherein said means for sub-cooling the freezing zone liquid feedstream comprise an indirect means for heat transfer.

12. The separation means of claim 11 wherein said indirect means for heat transfer comprise a heat exchanger.

13. The separation means of claim 10 wherein said means for sub-cooling the freezing zone liquid feedstream comprise means for mixing the freezing zone liquid feedstream with portions of the tower overhead liquid product.

* * * * *